United States Patent Office 3,761,281
Patented Sept. 25, 1973

3,761,281
COMPOSITION FOR MAKING MACAROON-TYPE BAKED PRODUCTS
Aldo Ferrero, Via Ampere 9, Milan, Italy
No Drawing. Continuation-in-part of abandoned application Ser. No. 767,505, Oct. 14, 1968. This application Apr. 6, 1971, Ser. No. 131,799
Claims priority, application Italy, Oct. 21, 1967, 21,850/67
Int. Cl. A21d 13/08
U.S. Cl. 99—94
4 Claims

ABSTRACT OF THE DISCLOSURE

Macaroon-type baked products, that is baked products having a crunchy but cellular structure, of the type normally obtained by baking products using ground almonds, apricot pits, or the like are obtained by the baking of compositions of flour obtained by grinding a puffed cereal, plus an edible shortening, egg albumen and sugar.

CROSS REFERENCE TO RELATED APPLICATION

This application is a continuation-in-part of my copending application Ser. No. 767,505, filed Oct. 14, 1968, for "Composition for Biscuits and Sweet Decorations To Be Baked," now abandoned.

BACKGROUND OF THE INVENTION

It is well known to bake biscuits of the type of macaroons and the like utilizing ground almonds (sweet or bitter) or ground apricot pits, cashew nuts, peanuts, or the like, in addition to sugar and the other ingredients. Actually, very careful grinding of the nut must take place in order to prevent the separation of the oil therefrom. In addition, it is necessary to carry out the subsequent kneading step with the other ingredients in a very careful manner, and the overall baking process therefore cannot be utilized for mass production but is suitable mainly for individual, small, expert bake shops. The macaroon-type products which are produced utilizing the ground almonds or the like are recognizable by their cellular internal structure.

SUMMARY OF THE INVENTION

Generally speaking, in accordance with the present invention, a flour or meal obtained by grinding of a puffed cereal is mixed with an edible shortening, which mixture serves as a substitute for ground nuts ordinarily used for baking the macaroon type products with an internal cellular structure and an external cracked surface, and further mixed with egg albumen and sugar to provide a composition which can be used for the baking of products with the same type of structure. Depending upon the type of flavoring used, e.g. almond flavor, coffee flavor, strawberry flavor, etc., the final baked product can be given the flavor of ordinary almond macaroons, or any desired flavor.

It is accordingly a primary object of the present invention to provide compositions for baking what can be referred to as "artificial macaroon-type" products as well as for baking surface glazes of this type on other baked products.

It is yet a further object of the present invention to provide a composition for baking such artificial macaroon-type baked products and the like which permits mass production type operation with respect to manufacture of the composition and baking of the baked products.

It is yet a further object of the present invention to provide doughs prepared from such compositions and also to provide baked products obtained by baking such compositions.

It is still a further object of the present invention to provide compositions and baked products, all of which can be mass produced and which nevertheless can have the home bake shop appearance and taste of products obtained using carefully ground almonds or other nuts.

Other objects and advantages of the present invention will be apparent from a further reading of the specification and of the appended claims.

In accordance with the present invention a composition is prepared from a flour or meal obtained by grinding or milling of a previously puffed cereal such as puffed rice, puffed corn, puffed barley, puffed oats, puffed millet or puffed wheat, which can be used in the ordinary puffed form or in the form of a puffed pasta such as puffed spaghetti or puffed macroni. Thus, a pasta is an alimentary paste in processed form such as spaghetti or macaroni, or in the form of fresh dough such as for ravioli, and such alimentary paste can also be puffed in the same way as ordinary puffed wheat or the like. All of these products shall for convenience hereinafter be referred to as "puffed cereal," and a flour or meal obtained by grinding by any of these puffed cereals is suitable for use in accordance with the present invention.

It has been found that the flour from such puffed cereal absorbs the edible shortening (which can be a liquid shortening such as olive oil, peanut oil, soy bean oil, vegetable oil, or the like, or can be a soft edible shortening of animal origin such as lard, or a soft edible shortening of vegetable origin such as coconut fat, hydrogenated coconut fat, margarine, or can even be butter. Any of these edible shortenings can be mixed with the flour obtained from the puffed cereal and it has been found that this flour absorbs the edible shortening and can therefore be used in preparing compositions and eventually baked products having the same characteristics as compositions and baked products obtained by the careful grinding of nuts such as almonds, apricot pits or the like. The flour from the puffed cereal and the edible shortening are mixed with egg albumen and sugar and the resulting composition can be processed into a dough which can be given any desired shape and evenutally baked into biscuits or the like. Any desired flavoring can be used to give the final biscuit a desired almond flavor, strawberry flavor, coffee flavor, apricot flavor, or the like.

It is essential in accordance with the present invention in order to obtain baked products with the particular features mentioned above of internal cellular structure and cracked surface that the flour which is used be obtained by the milling of previousy puffed cereal. This is absolutely essential, and it is further essential that this special flour be mixed with edible shortening, egg albumen and sugar.

This composition may be kneaded and made homogeneous and of the desired plasticity (which plasticity is adjusted by a suitable amount of the egg albumen which is the liquid required for the kneading) into a homogeneous dough then shaped as desired, such as by a suitable machine commonly used in biscuit production and referred to as a forming machine. The thus formed kneaded dough is deposited on plates, molds, cloth and the like, and baked at the desired temperature, generally about 120° C.–160° C., for a fairly long period of time, generally about 20–30 minutes. The resulting biscuit has the internal cellular structure which is peculiar to so-called macaroons or what is known in Italian as "amaretto" which are conventionally obtained by using ground almonds or apricot pits in addition to the other ingredients.

Instead of baking biscuits, the same kneading operation on the same composition can be used to produce a so-called "glace" decoration or coating on other baked products such as brioches, croissants, etc., the entire procedure being the same except that the dough is shaped into a thin layer which is spread on the surface of the baked product to be thus decorated, and the entire dough then baked.

In order to produce the baked products in accordance with the invention the flour obtained from previously puffed cereal must be used in a substantial amount of between about 6–25% by weight, preferably about 15% by weight. The amount of the edible shortening is between about 1–10% by weight, and preferably about 5% by weight. The amount of egg albumen is between about 10–30% by weight and preferably about 18% by weight.

The amount of sugar, which may include admixed therewith a avoring such as almond flavor, coffee flavor, cocoa flavor, apricot flavor, or the like, is between about 35-83% by weight, and preferably about 62% by weight.

The above composition is kneaded and rolled into a dough, possibly with the addition of a small amount of water to facilitate shaping, then shaped as desired and baked.

In addition to the flour obtained from the puffed cereal, the edible shortening, the egg albumen, the sugar and the natural or artificial flavors, the composition can also include a chemical leavening agent such as ammonium bicarbonate or baking soda.

DESCRIPTION OF PREFERRED EMBODIMENTS

The following examples are given to further illustrate the present invention. The scope of the invention is not, however, meant to be limited to the specific details of the examples.

In each of the examples below reference will be made to "puffed wheat flour" or "puffed rice flour" or the like. What is meant in each case is the flour obtained by milling of the particular puffed cereal, that is the cereal which has been previously puffed and which is then milled, the resulting flour obtained from the milling being used.

EXAMPLES 1

A composition is prepared of the following ingredients:

| | Kg. |
|---|---|
| Puffed wheat flour | 1.5 |
| Peanut oil | 0.5 |
| Icing sugar | 2.5 |
| Sugar | 4.0 |
| Egg albumen | 1.8 |

The above composition is kneaded until a homogeneous dough is formed. The dough is shaped and baked in an oven at 140–150° C. for about 30–35 minutes.

EXAMPLE 2

Example 1 is repeated, however substituting 1.5 kg. of puffed rice flour for the 1.5 kg. of puffed wheat flour. The resulting biscuit is similar in texture and taste to the biscuit of Example 1.

EXAMPLE 3

Example 1 is repeated, however substituting flour obtained from puffed alimentary paste, that is puffed wheat pasta, for the puffed wheat flour of Example 1. The results are substantially the same.

EXAMPLE 4

A composition is prepared as follows:

| | Kg. |
|---|---|
| Puffed rice flour | 0.75 |
| Puffed oat flour | 0.75 |
| Soft margarine | 0.5 |
| Icing sugar | 2.5 |
| Sugar | 4.0 |
| Egg albumen | 1.8 |

The composition is kneaded into a dough, shaped into the form of biscuits and baked at about 140–150° C. for about 30–35 minutes.

EXAMPLE 5

A composition is prepared as follows:

| | Kg. |
|---|---|
| Puffed rice flour | 0.75 |
| Soft hydrogenated coconut fat | 0.5 |
| Icing sugar | 2.5 |
| Sugar | 4.0 |
| Egg albumen | 1.8 |
| Ammonium bicarbonate | 0.018 |

The above composition is prepared into a dough and baked as in Example 1.

EXAMPLE 6

A composition is prepared as follows:

| | | |
|---|---|---|
| Puffed oat flour | kg | 1.5 |
| Vegetable oils | kg | 0.5 |
| Icing sugar | kg | 2.5 |
| Sugar | kg | 4.0 |
| Egg albumen | | 1.8 |
| Ammonium bicarbonate | kg | 0.020 |
| Oil of bitter almonds | | To taste |

The above composition is kneaded into a dough and baked at about 140° C. for about 30 minutes. The resulting biscuit has the appearance and taste of almond macaroons.

EXAMPLE 7

Example 6 is repeated, however using puffed rice flour and strawberry flavor as well as vegetable coloring to give a strawberry color. The resulting biscuit has the appearance of a strawberry-colored macaroon and a strawberry taste. Since true strawberry macaroons cannot be made, this is quite a novel product.

This same example can be repeated however substituting different flavors and colorings such as cocoa powder, coffee, almond flavor, hazelnut flavor, or the like.

EXAMPLE 8

A composition is prepared of the following:

| | | |
|---|---|---|
| Puffed barley flour | kg | 1.5 |
| Peanut oil | kg | 0.5 |
| Ice sugar | kg | 2.5 |
| Powdered sugar | kg | 4.0 |
| Egg albumen | kg | 1.8 |
| Ammonium bicarbonate | grams | 18 |
| Powdered cocoa | kg | 0.5 |

The above composition is kneaded into a dough, shaped into biscuits and baked at a temperature of about 140–150° C. for 30–35 minutes.

EXAMPLE 9

The above example describes the production of a macaroon-type covering layer for leavened cakes.

The following components are used:

| | | |
|---|---|---|
| Puffed rice flour | grams | 100 |
| Peanut oil | do | 65 |
| Icing sugar | do | 250 |
| Powdered sugar | do | 450 |
| Liquid egg albumen | do | 150 |
| Bitter almond flavor | | To taste |

Instead of liquid egg albumen it is possible to use powdered egg albumen which is mixed with water in a ratio of 150 grams of powdered egg albumen to 1 liter of water, utilizing the necessary quantity to give the desired consistency to the batch.

The puffed rice flour, peanut oil, icing sugar and part of the egg albumen are mixed in a mixture. Then, while still mixing, the powdered sugar, the bitter almond flavor and the remaining egg albumen are added to bring the batch to the proper density, which is slightly hard. The resulting mix is spread on the leavened product, e.g. brioches, etc.

It is advisable to spray on the icing cover after spreading a little sugar and subsequently decorating it with small sugar grains, and finally to dust it with icing sugar by means of a silk sieve.

EXAMPLE 10

The following example describes the baking of macaroons.

The following components are used:

| | |
|---|---|
| Puffed wheat flour _____kg__ | 1.5 |
| Peanut oil _____kg__ | 0.5 |
| Icing sugar _____kg__ | 2.5 |
| Coarse sugar _____kg__ | 4.0 |
| Fresh egg albumen _____kg__ | 1.8 |
| Ammonium bicarbonate _____grams__ | 18–20 |

Bitter almond flavor added to the coarse sugar.

The flour, oil, icing sugar, ammonium bicarbonate and egg albumen are mixed carefully in a mixer, and then while still mixing, the coarse sugar flavored with the bitter almond flavor is added. With the remaining amount of egg albumen the batch is given the proper consistency, which is slightly hard, so that it can be molded. The dough is dressed by a dressing machine, on a pan which is slightly lubricated and not dusted, or on textile.

It is recommended in order to obtain a good cracked surface that the dough be uniformly wetted. It is baked at a temperature of about 150° C. for about 30–35 minutes.

The above obtained batch can be mixed, if desired, with a normal macaroon batch based on ground almonds, peanuts, or the like, without in any way altering the normal dressing and baking procedure.

EXAMPLE 11

The following example describes the production of a ready mix composition for home baking and the like. A composition is prepared of the following:

| | |
|---|---|
| Dry powdered egg albumen _____kg__ | 3100 |
| Sugar _____kg__ | 44,000 |
| Powdered sugar _____kg__ | 28,400 |
| Peanut oil _____kg__ | 5700 |
| Puffed wheat flour _____kg__ | 17,000 |
| Ammonium bicarbonate _____kg__ | 230 |
| Bitter almond flavor _____ | To taste |

The user of the above composition adds to the dry mix an amount of water equivalent to the amount removed from the fresh egg albumen to make the dry powdered egg albumen, and then kneads the same into a dough and bakes as previously described.

While the invention has been described in particular with respect to various compositions and baked products obtained therefrom, it is to be understood that variations and modifications of the alleged can be made without departing from the spirit or scope of the invention.

What is claimed is:

1. Composition for baking of macaroon-type products and decorations, said composition comprising as essential ingredients flour obtained from a substance selected from the group consisting of puffed cereal and puffed pasta, said flour being present in an amount between about 6–25% by weight, edible shortening in an amount between about 1–10% by weight, egg albumen in an amount between about 10–30% by weight and sugar in an amount between about 35–83% by weight.

2. Composition according to claim 1 wherein the amount of said flour is about 15% by weight, the amount of said edible shortening is about 5% by weight, the amount of said egg albumen is about 18% by weight, and the amount of said sugar is about 62% by weight.

3. Composition according to claim 1 wherein said flour is obtained from at least one puffed cereal, said puffed cereal being selected from the group consisting of puffed rice, puffed corn, puffed barley, puffed oats, puffed millet and puffed wheat.

4. Composition according to claim 1 in the form of a kneaded dough.

References Cited
UNITED STATES PATENTS

| | | | |
|---|---|---|---|
| 2,738,277 | 3/1956 | Cryns _____ | 99—83 |
| 3,508,926 | 4/1970 | Werbin et al. _____ | 99—1 |
| 3,580,728 | 5/1971 | Gulstad et al. _____ | 99—81 |

RAYMOND N. JONES, Primary Examiner

J. R. HOFFMAN, Assistant Examiner

U.S. Cl. X.R.

99—86, 92